Dec. 3, 1968 H. M. MANASEVIT 3,414,434
SINGLE CRYSTAL SILICON ON SPINEL INSULATORS
Filed June 30, 1965
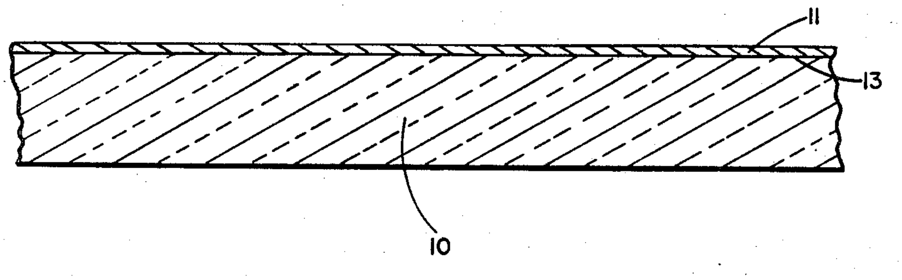
INVENTOR.
HAROLD M. MANASEVIT
BY Robert G. Rogers
ATTORNEY 3,414,434
Patented Dec. 3, 1968

3,414,434

SINGLE CRYSTAL SILICON ON SPINEL INSULATORS

Harold M. Manasevit, Anaheim, Calif., assignor to North American Rockwell Corporation, a corporation of Delaware Filed June 30, 1965, Ser. No. 468,205
7 Claims. (Cl. 117—201)

ABSTRACT OF THE DISCLOSURE

A composite of single crystal silicon epitaxially disposed on an electrically insulating substrate of spinel. Suitable spinels include $MgAl_2O_4$, $ZnAl_2O_4$, $FeAl_2O_4$, $MnAl_2O_4$, $MnCrO_4$, $MgCr_2O_4$, $FeCr_2O_4$, $Fe_3O_4$, $MnCr_2O_4$, $Co_3S_4$, $Ni_3S_4$ and $MgFe_2O_4$. The product is useful in the fabrication of electrically isolated microelectronic circuits.

This invention relates to single crystalline silicon grown upon crystalline spinel insulators.

The composites of this invention are useful in the technology of translating devices, which are of interest as separate entities or in microelectronic circuits. The insulating capability of the substrate permits the fabrication of electrically isolated circuits, and therefore, such circuitry is not affected by stray capacitance effects that are present when silicon is used as a substrate for multi-devices. The circuits may be produced by dividing the film into sections such as by mechanical or chemical etching techniques and subsequently impregnating the divided portions with impurities to convert the areas into semiconductor devices.

The characterizing feature of this invention is a composite of crystalline silicon grown upon an electrically insulating substrate of spinel. The use of spinel as a substrate for single crystal silicon growth is advantageous not only because of its insulating nature and thermal conductivity but also because of its crystal structure and physical properties. Spinel is cubic and isotropic and physical properties are not influenced by orientation. Spinel substrates are also relatively easier and less expensive to fabricate than, for example, alpha-aluminum oxide substrates. Spinel has the added advantage over $Al_2O_3$, for example, in that it is more susceptible to chemical polishing and is easier to polish mechanically to the surface finish required for good epitaxial growth of semiconductor thereon.

One mineral spinel is a crystal comprising Mg, Al, and O in a ratio given by the formula ($MgO \cdot nAl_2O_3$) where *n*, for example, has a value of between 1 and 5 as indicated by Kingery, W. D. in "Introduction to Ceramics," 1960. The term spinel also encompasses minerals or structures or compounds having a similar crystal structure as that exemplified above.

The formula, $$RY \cdot nM_2X_3$$

may be used to describe various minerals encompassed by the term spinel. R may be the same element as M, and Y may be the same element as X, as shown in example $FeO \cdot Fe_2O_3$. X and Y are generally element from Group VI of the Periodic Table such as oxygen or sulfur. R usually is a divalent element although in certain instances it may also be a trivalent as usually is the case for M. The ratio indicated by *n* may have the values for spinel indicated by Kingery, referenced above.

Examples of spinels such as aluminates, chromates, ferrites and thiospinels are described by C. W. Parmeler, "A Study of Typical Spinels," in the University of Illinois Engineering Experiment Station Bulletin #248, 1932; by K. W. Andrews, "An X-Ray Study of Spinels in Relation to Chrome-Magnesite Refractories," in Trans. British Ceramic Society, volume 50, No. 2, February 1951, and by R. Wyckoff in a book entitled, "Crystal Structures," Interscience Publishers, 1963.

Spinels include but are not limited to $MgAl_2O_4$, $ZnAl_2O_4$, $FeAl_2O_4$, $MnAl_2O_4$, $MnCrO_4$, $MgCr_2O_4$, $FeCr_2O_4$, $MgF_2O_4$, $Fe_3O_4$, $MnCr_2O_4$, $Co_3S_4$, $Ni_3S_4$.

The depositing silicon also belongs to the cubic system, and it was determined that the orientation of the silicon growth coincides with the orientation of the substrate. For example, (111) silicon grown epitaxially coincides with (111) spinel.

The spinel, which is the substrate described herein, may include both clear, colored, natural and synthetic spinels.

It is therefore an object of this invention to provide single crystalline silicon single films epitaxially grown upon a spinel insulating substrate.

It is another object of this invention to provide single crystalline silicon films on relatively easily fabricated insulating substrates.

These and other objects of the invention will become apparent in the accompanying description, examples and figures of which the drawing is a representation of a composite of this invention shown in a section on a greatly enlarged scale.

Referring now to the drawing, reference numeral 10 designates a substrate of a spinel insulator with a film 11 of single crystal silicon epitaxially grown upon a substrate which is chemically bonded to the substrate. The surface of substrate 10 upon which the film 11 is joined, representing the interface between film 11 and substrate 10, is designated by reference numeral 13.

Silicon deposits of the composites of this invention have been obtained by high temperature hydrogen reduction of silicon tetrachloride and by thermal decomposition of silane. The film could also be produced by the reduction and the decomposition of other silicon halides or by vacuum evaporation, sputtering, or any other process in which a vapor transfer of elemental silicon to the spinel surface occurs or is the final product. Such typical chemicals as trichlorosilane, silicon tetrabromide and silicon tetraiodide may be used as silicon sources in which the film is deposited by reaction deposition.

A more uniform crystalline deposit is obtained on substrates which are relatively scratch-free, extremely flat, and are free from dust and other surface contaminants. Often a mechanically polished substrate surface is cleaned, such as by successively treating the surface with trichloroethylene, synthetic detergent solutions, distilled water, hydrochloric acid, and a methyl alcohol rinse to prepare the substrate for single crystalline silicon growth.

Confirmation of single crystallinity of the films of the composites of the invention have been established through X-ray analysis using both the Laué back reflection technique and the full circle goniometer. The films do not separate from their substrates when the composites are flexed. Also, it has been found that when a film of this invention is dissolved from its substrate by treatment with a hydrofluoric-nitric acid solution, the surface of the substrate from which the silicon film was removed is no longer suitable for good deposition of single crystal silicon, indicative of an adherent chemical bonding of deposit to the substrate.

The term "single crystal" as used herein for referring to the single crystal silicon films and substrate of the composite of this invention, is a generic term comprehending imperfections or faults normally associated with crystals, such as for example, twins, stacking faults and other dislocations.

The invention is hereinafter illustrated in greater detail by description in connection with the following examples:

EXAMPLE I

A synthetic ($MgO \cdot Al_2O_3$) disc of 1" diameter and 40 mils thickness, having a surface orientation of (111) was optically polished to a scratch-free finish and cleaned with successive washing treatments preliminary to having silicon deposited thereon. For deposition of silicon film upon the substrate, it was placed upon a silicon pedestal in a reaction chamber, the pedestal being adapted to be heated by a radio-frequency heater. A spacer of aluminum oxide was positioned between the pedestal and the disc or substrate. The spacer served to provide for uniform heating of the substrate and to prevent direct pickup of silicon from the pedestal by the underside of the substrate. The spinel substrate was heated to a pedestal temperature of approximately 1250° C. For a preliminary hydrogen etch, purified hydrogen gas was passed through a deoxidizer, molecular sieves, and liquid nitrogen traps and thence through the reaction chamber at a rate of about 3 liters per minute for a period of about 10 minutes, whereupon the temperature of the spinel was reduced to about 1150° C. A portion of the hydrogen gas (flow rate about 800 cc./min.) was diverted at a place upstream of the reaction chamber and bubbled through liquid silicon tetrachloride maintained at —45° C. The stream of hydrogen and silicon tetrachloride was combined with the mainstream of the hydrogen gas and passed into the reaction chamber. Flow of the mixture of hydrogen and silicon tetrachloride through the chamber was effected for a period of about 25 minutes. It was thereupon observed that a uniform film of about 10 microns thick covered the exposed surfaces of the substrate. The film was examined by the Laué back reflection technique, which revealed one set of spots characteristic of single crystalline silicon superimposed upon another set of spots characteristic of spinel.

EXAMPLE II

The procedure of Example I was repeated except that silane was used in the place of silicon tetrachloride. A cylinder of silane, at 100 p.s.i., was connected to the hydrogen flow line, and the silane cylinder was opened to permit flow of silane into the hydrogen for mixture with the hydrogen at a rate of about 100 cc. per minute, the hydrogen being fed to the reaction chamber at a flow rate of about 6 liters per minute. Exposure of the spinel disc to the silane and hydrogen mixture was carried out for a period of about three minutes with the result that a film of about 3 microns thick was observed to have been grown upon the spinel substrate. X-ray examination of the film revealed a single crystal pattern of silicon superimposed upon a spinel pattern.

Although the invention has been described and illustrated in detail, it is to be understood that the same is by way of illustration and example only, and is not to be taken by way of limitation; the spirit and scope of this invention being limited only by the terms of the appended claims.

I claim:

1. A composite comprising a substrate of single crystal magnesia aluminate ($MgO \cdot Al_2O_3$) and a film of single crystalline silicon chemically bonded to said substrate.

2. A composite comprising a substrate of single crystalline magnesium aluminate spinel having the formula ($MgO \cdot nAl_2O_3$), where $n$ has a value of between 1 and 5, and a film of single crystalline silicon epitaxially disposed on said substrate.

3. A composite according to claim 2 in which said spinel substrate and said silicon film have the same orientation.

4. A composite according to claim 2 in which said substrate has an orientation of (111) and said silicon has an orientation of (111).

5. A composite according to claim 2 in which said spinel substrate has an orientation of (100) and said silicon has an orientation of (100).

6. A composite according to claim 2 in which said spinel substrate has an orientation of (110) and said silicon has an orientation of (110).

7. A composite comprising a film of monocrystalline silicon epitaxially disposed on a single crystal, electrically insulating substrate, said substrate selected from the class consisting of $MgAl_2O_4$, $ZnAl_2O_4$, $FeAl_2O_4$, $MnAl_2O_4$, $MnCrO_4$, $MgCr_2O_4$, $FeCr_2O_4$, $Fe_3O_4$, $MnCr_2O_4$, $Co_3S_4$, $Ni_3S_4$ and $MgFe_2O_4$.

References Cited

UNITED STATES PATENTS

| | | | |
|---|---|---|---|
| 3,173,814 | 3/1965 | Law | 148—1.5 X |
| 3,177,100 | 4/1965 | Mayer et al. | 117—106 X |

OTHER REFERENCES

Manasevit et al.: Single Crystal Silicon on a Sapphire Substrate, in Journal of Applied Physics, volume 35, No. 4, pp. 1349–1351, April 1964.

ALFRED L. LEAVITT, *Primary Examiner.*